Patented May 28, 1946

2,400,872

UNITED STATES PATENT OFFICE 2,400,872

DIAMINO-N-ALKYL PHENAZINIUM SALTS

Leslie G. S. Brooker and Homer W. J. Cressman, Rochester, N. Y., assignors to Eastman Kodak Company, Rochester, N. Y., a corporation of New Jersey No Drawing. Application September 1, 1942, Serial No. 456,926

13 Claims. (Cl. 260—267)

This invention relates to diamino-N-alkyl phenazinium salts and to a process for preparing them.

Diamino-N-aryl phenazinium salts are well known. Phenosafranine, one of the oldest known dyes, is a 3,7-diamino-5-phenylphenazinium salt having the following formula:

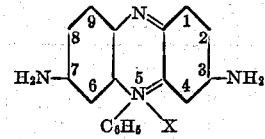

wherein X represents an acid radical. It is usually prepared by oxidizing a mixture of p-phenylenediamine and aniline. Phenosafranine has been widely used as a desensitizer of photographic silver halide emulsions.

Another powerful photographic desensitizer is the isomeric 1,3-diamino-5-phenyl phenazinium salt which is stated to be the composition of Pinakryptol Green (I. N. Gorbacheva and L. I. Levkoeff, Photo-Chem. Ind., 59 to 63, 1936).

We have now found diamino-N-alkyl phenazinium salts and that they are superior to Pinakryptol Green as photographic desensitizers. The N-alkyl compounds, as compared to the N-aryl compounds, are either more powerful desensitizers or less readily precipitated by photographic developers.

It is, accordingly, an object of our invention to provide new diamino-N-alkyl phenazinium salts. Another object is to provide a process for preparing such salts. A further object is to provide photographic emulsions desensitized with such salts and a process for preparing the emulsions. A still further object is to provide an improved photographic developer comprising such salts. Other objects will appear hereinafter.

In accordance with our invention, we prepare diamino-N-alkyl phenazinium salts by reducing dinitro-N-alkyl-5,10-dihydrophenazines in the presence of an acid. As dinitro-N-alkyl-5,10-dihydrophenazines the following are exemplary: 5-methyl-1,3- dinitro - 5,10-dihydrophenazine, 5-ethyl-1,3-dinitro-5,10-dihydrophenazine, 1,3-dinitro-5-benzyl-5,10-dihydrophenazine and 5-(β-hydroxyethyl) - 1,3 - dinitro -5,10-dihydrophenazine.

The reduction is advantageously effected using a metallic salt reducing agent, in the presence of the acid corresponding to the anion of the metallic salt. Stannous chloride and hydrochloric acid are advantageously employed. Iron and tin in the presence of acid can be employed.

The following examples will serve to illustrate our new N-alkyl phenazinium salts and the manner of preparing the same.

*Example 1.—1.3-diamino-5-methylphenazinium chloride*

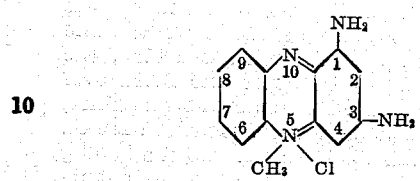

A mixture of 9.4 g. (1 mol.) of 5-methyl-1,3-dinitro-5,10-dihydrophenazine, 45 g. (12 mol.) of stannous chloride, 135 cc. of 10% (by weight) hydrochloric acid and 135 cc. of ethyl alcohol was heated under reflux on a steam bath for 1¾ hours. The dark greenish reaction mixture was intermittently agitated during the refluxing. Upon cooling the reaction mixture and standing in the ice-box for 10 to 12 hours, the double tin salt of the phenazinium salt separated out. It was collected on a filter, and washed successively with 20% hydrochloric acid, ethyl alcohol and diethyl ether. The dark-colored double salt (14.5 g.) was decomposed by adding it in portions to 1500 cc. of boiling water and boiling the resulting mixture for 15 minutes. The resulting solution was filtered, and the phenazine salt precipitated by the addition of sodium chloride to the filtered solution and chilling in an ice-box. The crude yield was 7.2 g. (84% yield). After two recrystallizations from methyl alcohol (50 cc. per gram of phenazine salt), the dark colored crystals which were obtained melted at 296° to 297° C. with decomposition. The yield of pure product was 50%. An ethyl alcoholic solution of the dye was dull green.

The 5-methyl-1,3-dinitro-5,10-dihydrophenazine employed above was prepared in the following manner: To a suspension of 16.2 g. (1 mol.) of N-methyl-o-picrylaminoaniline (M. P. 145° to 195° C.) in 250 cc. of methyl alcohol, refluxing on a steam bath and mechanically stirred, were added dropwise over a 10 minute period, 2.1 g. (1 mol.) of sodium hydroxide, dissolved in 25 cc. of water. The reaction mixture soon assumed a violet coloration. Heating and stirring were continued for an additional 20 minutes. After cooling the mixture in an ice-box, the dihydrophenazine was collected on a filter, and washed successively with water and with methanol. The yield of purple colored crystals (M. P. 247° to 248° C. decp.) was 12.3 g. (89%).

The N-methyl-o-picrylaminoaniline employed above was made according to the method of Kehrmann and Punti, Ber. 44, 2622 (1911), to wit: To a cold solution of 7.4 g. (1 mol.) of o-amino-N-methylaniline in 75 cc. of absolute ethyl alcohol were added, cautiously, 15 g. (1 mol.) of picryl chloride. The resulting dark, brownish solution which had warmed up considerably, was refluxed on a steam bath for 10 minutes. To complete the reaction 5 g. (1 mol.) of fused sodium acetate were added and heating was continued for another 10 minutes. On chilling the product crystallized; it was filtered, washed with water and then with cold methyl alcohol. The yield of brownish crystals was 16.2 g. (81%). The product did not have a definite melting point (145° to 195° C.) It was contaminated with 5-methyl-1,3-dinitro-5,10-dihydrophenazine.

The o-amino-N-methylaniline employed above was prepared as follows: A mixture of 15.7 g. (1 mol.) of o-nitro-chlorobenzene, 9.3 g. (1 mol.+ 200% excess) of anhydrous methylamine and 75 cc. of absolute ethyl alcohol were heated in a sealed tube at 150° C. for 18 hours. When cold the contents of the tube were transferred to a 500 cc. round-bottomed flask to distill off the excess amine and most of the solvent. The residue was extracted with ether (1 liter); the extract was washed with water and dried over potassium carbonate. After removal of the ether, the residual oil (15.6 g.) was suspended in 150 cc. methyl alcohol and 75 cc. water. To the boiling mixture, heated on a water bath and mechanically stirred, was added in portions over a 30 minute period 52.5 g. (2.5 mols.) of sodium hydrosulfite. The whole was refluxed and stirred an additional 30 minutes. After distilling off most of the methyl alcohol, the residue was poured into 250 cc. ice water, made alkaline, and extracted with ether. The extract (800 cc.) was dried over potassium carbonate and concentrated on the water bath in the usual way. The residue (9.3 g.) was distilled under reduced pressure. The yield of lemon-colored oil, B. P. 118–20 at 8 mm., was 7.4 g. (60% of the theoretical amount).

*Example 2.—1,3-diamino-5-ethyl-phenazinium chloride*

Similarly, 1,3 - diamino - 5 - ethylphenazinium chloride was prepared from 5-ethyl-1,3-dinitro-5,10-dihydrophenazine. The yield of crude dye was 38%. It was obtained as dark, brownish needles (M. P. 316–17 decp.) after one recrystallization from ethyl alcohol (50 cc./g.) An alcoholic solution of the dye is dull green.

The intermediates required for the synthesis were prepared by methods analogous to those described under Example 1:

|  | B. P. or M. P. | Appearance | Yield |
|---|---|---|---|
|  |  |  | *Per cent* |
| o-Amino-N-ethylaniline | 121-23/10 mm | Yellowish oil. | 57 |
| N-ethyl-o-picrylaminoaniline. | 165-225 | Brown crystals. | 68 |
| 5-ethyl-1, 3-dinitro-5, 10-dihydrophenazine. | 258-60 dec | Purple crystals. | 73 |

*Example 3.—1,3-diamino-5-β-hydroxyethylphenazium chloride*

In like manner 5-β-hydroxyethyl-1,3-dinitro-5,10-dihydrophenazine was reduced to 1,3-diamino-5-β-hydroxyethylphenazinium chloride. The yield of crude dye was 50%; 21% after two recrystallizations from methyl alcohol (135 cc./g.). An alcoholic solution of the black crystals (M. P. 316° with decomposition) is dull green.

The intermediates, prepared by methods analogous to those described above, are:

|  | M. P. | Appearance | Yield |
|---|---|---|---|
|  |  |  | *Per cent* |
| o-Amino-N-β-hydroxyethylaniline. | 105-106 | Light yellow crystals. | 40 |
| N-β-hydroxyethyl-o-picrylaminoaniline. | 185-247 | Brownish powder. | 78 |
| 5-β-hydroxyethyl-1, 3-dinitro-5, 10-dihydrophenazine. | 252-53 decp | Purple crystals. | 61 |

*Example 4.—1,3-diamino-5-benzylphenazinium chloride*

Employing the above procedure, 1,3-diamino-5-benzylphenazinium chloride was obtained from 5-benzyl-1,3-dinitro-5,10-dihydrophenazine. The yield of crude product was 12%. After two recrystallizations from methyl alcohol (50 cc./g.), the almost black powder melted at 263–64° with decomposition. An alcoholic solution of the dye is dull green.

The intermediates are:

|  | M. P. | Appearance | Yield |
|---|---|---|---|
|  |  |  | *Per cent* |
| o-Amino-N-benzylaniline. | 50-52 | Colorless crystals. | 64 |
| N-benzyl-o-picrylaminoaniline. | 155-56 | Brown crystals. | 91 |
| 5-benzyl-1,3-dinitro-5, 10-dihydrophenazine. | 255-56 decp | Violet crystals. | 75 |

*Example 5.—1,3-diamino-5-methylphenazinium chloride*

To 0.6 g. (1 mol.) of 5-methyl-1,3-dinitro-5,10-dihydrophenazine, 1 cc. of concentrated hydrochloric acid, 10 cc. of water and 35 cc. of ethyl alcohol, mechanically agitated and heated under reflux on a steam bath, were added 0.8 g. of iron powder, in portions over a period of ten minutes. Heating and stirring were continued for a further period of 45 minutes. The solution after a time assumed a deep green coloration. The hot reaction mixture was filtered to remove excess iron and then chilled. The dark product which separated was collected on a filter and washed with 20 percent hydrochloric acid and acetone. It was purified by dissolving in 125 cc. of hot boiling water, boiling for several minutes, filtering, and precipitating from the aqueous filtrate by adding sodium chloride and chilling. On recrystallization from methyl alcohol, the dye was obtained as black crystals, melting at 290° to 293° C. Yield, .075 g., 15 percent.

*Example 6.—1,3-diamino-5-methylphenazinium chloride*

A mixture of 2.9 g. (1 mol.) of 5-methyl-1,3-dinitro-5,10-dihydrophenazine, 7.1 g. of metallic tin, 41 cc. of 10 percent hydrochloric acid and 41 cc. of ethyl alcohol were refluxed on a steam bath for 1½ hours. The solution assumed a dark green coloration after 10 minutes. On chilling the double tin salt separated out. This double salt was treated as in Example 1 to obtain the 1,3 - diamino - 5 - methylphenazinium chloride. Yield 0.8 g., 31 percent.

Our diamino-N-alkylphenazinium salts can be employed to desensitize photographic silver halide emulsions, such as gelatino-silver-chloride, bromide, chlorobromide or bromiodide emulsions, by bathing the elements containing the emulsions in desensitizing pre-baths containing the phenazinium salts. A solution of one or more of our new phenazinium salts in distilled water (1 part of phenazinium salts to 10,000 parts water) is suitable as a pre-bath. The phenazinium salts can also be employed in photographic developers, such as N-methyl-p-aminophenol-borax developers, as desensitizers. The following developer formula is illustrative:

N-methyl-p-aminophenol _____ grams__ 3
sodium sulfite (desiccated) _____ do____ 100
borax _____ do____ 5
water to _____ liter__ 1
phenazinium salt _____ gram__ 0.02 to 0.1

What we claim as our invention and desire to be secured by Letters Patent of the United States is:

1. A 1,3-diamino-5-alkylphenazinium salt of the following general formula:

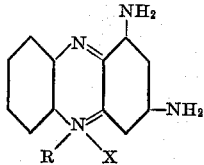

wherein R represents an alkyl group and X represents an anion.

2. A 1,3-diamino-5-methylphenazinium salt of the following general formula:

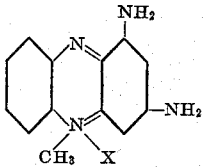

wherein X represents an anion.

3. 1,3-diamino-5-methylphenazinium chloride of the following formula:

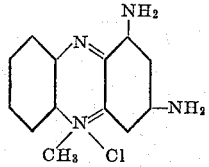

4. A 1,3-diamino-5-ethylphenazinium salt of the following general formula:

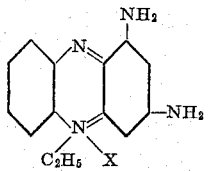

wherein X represents an anion.

5. 1,3-diamino-5-ethylphenazinium chloride of the following formula:

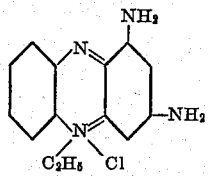

6. A 1,3-diamino-5-(β-hydroxyethyl)-phenazinium salt of the following general formula:

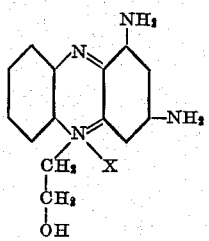

wherein X represents an anion.

7. 1,3-diamino-5-(β-hydroxyethyl)-phenazinium chloride of the following formula:

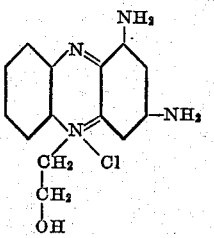

8. A process for preparing an amino-N-alkyl phenazinium salt comprising reducing a nitro-N-alkyl-5,10-dihydrophenazine, in the presence of an acid.

9. A process for preparing a diamino-N-alkyl-phenazinium salt comprising reducing a dinitro-N-alkyl-5,10-dihydrophenazine, in the presence of an acid, and stannous chloride, tin or iron.

10. A process for preparing a 1,3-diamino-5-alkyl-phenazinium salt comprising reducing a 1,3-dinitro-5-alkyl-5,10-dihydrophenazine, in the presence of an acid.

11. A process for preparing a 1,3-diamino-5-alkyl-phenazinium salt comprising reducing a 1,3-dinitro-5-alkyl-5,10-dihydrophenazine with stannous chloride, in the presence of hydrochloric acid.

12. A process for preparing an amino-5-alkyl-phenazinium salt comprising reducing a nitro-5-alkyl-5,10-dihydrophenazine with stannous chloride, in the presence of hydrochloric acid.

13. A process for preparing a diamino-5-alkyl-phenazinium salt comprising reducing a dinitro-5-alkyl-5,10-dihydrophenazine with stannous chloride, in the presence of hydrochloric acid.

LESLIE G. S. BROOKER.
HOMER W. J. CRESSMAN.